United States Patent
Bachmaier et al.

(10) Patent No.: US 10,156,191 B2
(45) Date of Patent: Dec. 18, 2018

(54) STROKE TRANSMITTER FOR GAS TURBINE

(75) Inventors: Georg Bachmaier, München (DE);
Michael Höge, Kirchseeon (DE);
Joachim Nordin, Linghem (SE)

(73) Assignee: SIEMENS AKTIENGESELLSCHAFT, München (DE)

( * ) Notice: Subject to any disclaimer, the term of this patent is extended or adjusted under 35 U.S.C. 154(b) by 1282 days.

(21) Appl. No.: 14/005,296

(22) PCT Filed: Mar. 1, 2012

(86) PCT No.: PCT/EP2012/053537
§ 371 (c)(1),
(2), (4) Date: Nov. 20, 2013

(87) PCT Pub. No.: WO2012/123264
PCT Pub. Date: Sep. 20, 2012

(65) Prior Publication Data
US 2014/0083104 A1    Mar. 27, 2014

(30) Foreign Application Priority Data

Mar. 16, 2011 (EP) .................... 11158461

(51) Int. Cl.
*F02C 9/26* (2006.01)
*F02C 9/28* (2006.01)
(52) U.S. Cl.
CPC ................. *F02C 9/28* (2013.01); *F02C 9/26* (2013.01); *F05D 2260/50* (2013.01)

(58) Field of Classification Search
CPC ........... F02C 9/26; F02C 9/28; F02D 2260/60
See application file for complete search history.

(56) References Cited

U.S. PATENT DOCUMENTS

| | | | |
|---|---|---|---|
| 4,275,558 A * | 6/1981 | Hatch | F02C 9/26 |
| | | | 60/39.281 |
| 4,799,462 A | 1/1989 | Junghans | |
| 4,803,393 A * | 2/1989 | Takahashi | F02M 47/02 |
| | | | 123/478 |
| 5,549,137 A | 8/1996 | Lenz et al. | |
| 5,630,550 A | 5/1997 | Fujiwara | |
| 5,857,662 A | 1/1999 | Kappel | |
| 6,062,532 A | 5/2000 | Guerich | |
| 6,725,876 B2 | 4/2004 | Bowman et al. | |

(Continued)

FOREIGN PATENT DOCUMENTS

| | | |
|---|---|---|
| DE | 4306072 A1 | 9/1994 |
| DE | 102007053423 A1 | 5/2009 |
| DE | 102009015738 A1 | 10/2010 |

(Continued)

*Primary Examiner* — Arun Goyal

(57) ABSTRACT

A stroke transmitter is presented. The stroke transmitter includes a conduit for providing a passage to a fluid, an actuating unit for increasing pressure in an hydraulic fluid, a valve unit configured to operate depending on the pressure of the hydraulic fluid, the valve unit arranged inside the conduit to regulate a flow of the fluid, and a pipe connecting the actuating unit and the valve unit for communicating the pressure of the hydraulic fluid between the actuating unit and the valve unit. The actuating unit is arranged outside the conduit.

14 Claims, 2 Drawing Sheets

(56) References Cited

U.S. PATENT DOCUMENTS 7,044,407 B2 * 5/2006 Fischer .............. F02M 51/0603
   239/453
2001/0045880 A1 11/2001 Czimmek

FOREIGN PATENT DOCUMENTS

| | | |
|---|---|---|
| EP | 0515307 A1 | 11/1992 |
| EP | 0864743 A2 | 9/1998 |
| FR | 2504190 A1 | 10/1982 |
| RU | 99845 U1 | 11/2010 |
| SU | 468616 A1 | 4/1975 |

* cited by examiner

STROKE TRANSMITTER FOR GAS TURBINE

CROSS REFERENCE TO RELATED APPLICATIONS

This application is the US National Stage of International Application No. PCT/EP2012/053537 filed Mar. 1, 2012 and claims benefit thereof, the entire content of which is hereby incorporated herein by reference. The International Application claims priority to the European application No. 11158461.1 EP filed Mar. 16, 2011, the entire contents of which is hereby incorporated herein by reference.

FIELD OF INVENTION

The present invention relates to a stroke transmitter and a gas turbine with such a stroke transmitter.

BACKGROUND OF INVENTION

Gas turbines include individual burners that may interfere with each other during operation. This can prevent an efficient operation of the turbine and lead to increased emission, in particular to the increase of nitrogen oxides ($NO_x$), an uneven flame temperature, oscillations and so forth. These unwanted effects may occur under atmospheric conditions as well as under pressurized combustion processes. Gas turbines often include orifices that are used to equalize the fluid flow to the individual burners of the gas turbine in order to compensate for these effects.

The burners in the gas turbine receive fluid from a manifold which usually includes an inlet and several outlets. This may lead to pressure difference over a length of the manifold and also at the position of the burners. Additionally, differences may occur due to tolerances introduced while manufacturing manifolds and burners to the gas turbine.

The differences are equalized by altering the size of openings in the orifices; this adjustment or modification needs to be performed regularly and is a time consuming and expensive process.

Use of piezoelectric valves in place of the orifices obviates the above mentioned problem since piezoelectric valves can adjust or control the mass flow due to the presence of piezoelectric actuator. In this type of arrangement the piezoelectric valve including the actuator are arranged axially in the fluid flow path.

However, piezoelectric actuator may be damaged while coming in contact with hot fluid which has a temperature greater than about 140 degrees centigrade. Additionally, it may also be difficult to place the piezoelectric actuator on the gas turbine since auxiliary systems and other components such as pipes often limit the available space.

U.S. Pat. No. 6,062,532A teaches an electric solid-body actuator having a hydraulic displacement (amplitude) magnifier which has a leakage-free construction and, at the same time, permits a temperature compensation, as a result of which, for example, an extended operation of a setting member into defined switching positions may be achieved.

U.S. Pat. No. 5,857,662A teaches an electrically activatable stop device which possesses good dynamic properties. Moreover, the stop device is to have a compact design, work in an operationally reliable manner and be capable of being used within a wide temperature range.

SUMMARY OF INVENTION

It is therefore an object of the present invention to provide an arrangement such that the piezoelectric actuator is not damaged by hot fluid and/or can easily be designed to fit a specific application.

The object is achieved by providing a stroke transmitter according to the claims.

The present invention suggests a stroke transmitter including a conduit for providing passage to a fluid, an actuating unit for increasing pressure in an hydraulic fluid, a valve unit that is configured to operate depending on the pressure of the hydraulic fluid, the valve unit is arranged inside the conduit to regulate the flow of the fluid and a pipe connecting the actuating unit and the valve unit for communicating the pressure of the hydraulic fluid between the actuating unit and the valve unit, wherein the actuating unit is arranged outside the conduit. By arranging the actuating unit outside the conduit, the actuating unit is prevented from coming in contact with the potentially hot fluid passing through the conduit, thus preventing damage to the actuating unit and increasing the design flexibility of the actuating unit.

In one embodiment the valve unit and the actuating unit are arranged at an angle relative to each other. The angle enables separation of actuating unit from the valve unit, thus preventing the actuating unit to come in contact with the fluid path.

In one embodiment, the angle is from about 45 degrees to about 135 degrees between the valve unit and the actuating unit to provide an ease of manufacturing.

In another embodiment, the valve unit and the actuating unit are arranged perpendicular to each other to provide stability and ease of manufacturing.

In one embodiment, the actuating unit includes a first block mechanically coupled to an actuator which increases the pressure in the first block. The first block defines a hydraulic volume in the actuating unit.

The actuator is a piezoelectric actuator which increases the length of the stroke.

In one embodiment the valve unit includes a second block mechanically coupled to a dosing valve. The pressure exerted by the second block causes opening and closing of dosing valve.

In another embodiment, the opening and closing of dosing valve is achieved by a needle or a sphere. The needle or sphere ensures dosed feeding of fluid to the burner through the valve.

In one embodiment, the first block and/or the second block are metallic bellows. Metallic bellows ensure absence of friction and drifting in the stroke transmitter.

In one embodiment, the hydraulic fluid is oil which has low compressibility, low volatility and low foaming tendency.

In one embodiment, a first piston is guided into the first block and a second piston is guided into the second block. The first piston moves to displace a quantity of hydraulic fluid, which moves the second piston in the second block. With such an arrangement a quick and precise dosing of fluid is achieved.

In another embodiment, the actuating unit of the stroke transmitter is outside the hot fluid flow path. This prevents damage to the actuating unit from the high temperature fluid.

The valve unit is placed axially with respect to the fluid feed pipe axis for dosed feeding of fluid into the burner and the subsequent combustion chamber.

BRIEF DESCRIPTION OF DRAWINGS

The above-mentioned and other features of the invention will now be addressed with reference to the accompanying drawings of the present invention. The illustrated embodiments are intended to illustrate, but not limit the invention. The drawings contain the following figures, in which like numbers refer to like parts, throughout the description and drawings.

DETAILED DESCRIPTION OF INVENTION

Embodiments of the present invention relate to a stroke transmitter for use in a turbine and more particularly in a gas turbine. It may however be noted that the arrangement of stroke transmitter as will be described hereinafter may also be used in other systems such as, but not limited to, steam turbines, turbo fans, cars and valves.

Figure 1:
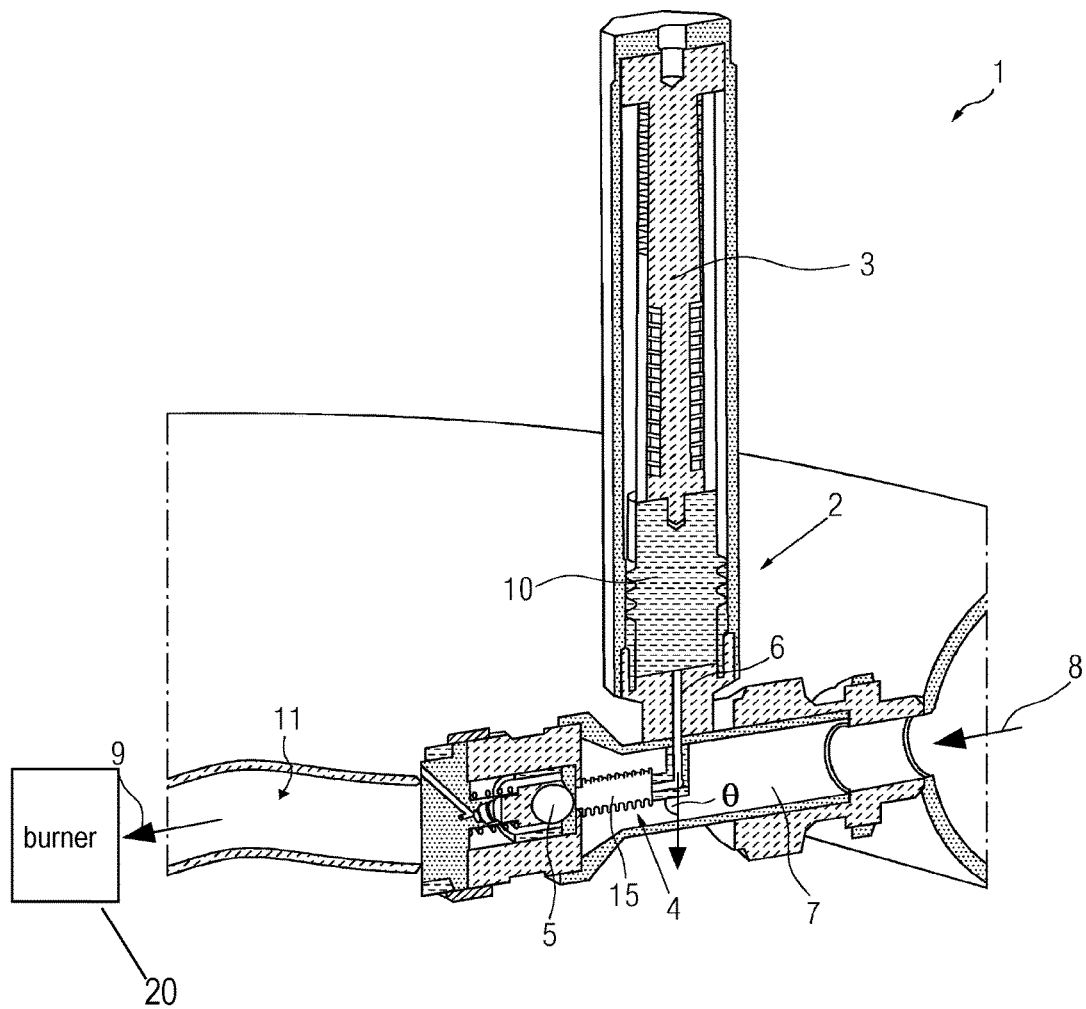
FIG. 1 is a schematic diagram of a stroke transmitter.

FIG. 1 is a schematic diagram of an exemplary stroke transmitter 1 for use in a gas turbine. The stroke transmitter includes an actuating unit 2 and a valve unit 4. The actuating unit 2 and the valve unit 4 are connected to each other through a pipe 6. The actuating unit 2 and the valve unit 4 include a hydraulic fluid, which can transfer the pressure generated by the actuating unit 2 to the valve unit 4 through the pipe 6.

In accordance with the aspects of the present technique, the valve unit 4 is enclosed inside a conduit 7 which provides a passage to a fluid. It may be noted that the temperature of the fluid can be greater than about 140 degrees centigrade. The fluid enters the conduit 7 through an inlet 8 and subsequently flows through the valve unit 4 which regulates the flow of the fluid through a dosing valve 5. Reference numeral 9 is representative of an outlet of the fluid after passing through the valve unit 4 into a burner 20 of the gas turbine.

In the presently contemplated configuration, the actuating unit 2 is arranged outside the conduit 7. Such an arrangement prevents the actuating unit 2 to be exposed to the fluid path in the conduit 7. As illustrated in FIG. 1, the valve unit 4 and the actuating unit 2 are arranged at an angle θ relative to each other. The angle θ is greater than 0 degrees and less than 180 degrees. More particularly, the angle θ is from about 45 degrees to about 135 degrees.

In accordance with aspects of the present technique, the valve unit 4 and the actuating unit 2 are arranged such that the valve unit 4 and the actuating unit 2 of the exemplary stroke transmitter 1 are perpendicular to each other.

The actuating unit 2 includes an actuator 3 for driving a first block 10. The first block 10 is filled with a hydraulic fluid, such as, but not limited to hydraulic oil. The actuator 3 increases the pressure on the hydraulic fluid in the first block 10. The pipe 6 transfers the pressure to the valve unit 4. More particularly, the valve unit 4 includes a second block 15 which causes the dosing valve 5 to open based on the pressure exerted by the hydraulic fluid in the second block 15.

In accordance with the aspects of the present technique, the actuator 3 is formed from a piezoelectric material. The piezoelectric materials include non-conductive materials such as crystals and ceramics. One such piezoelectric material is quartz ($SiO_2$). Generally, the actuator 3 is a piezoelectric actuator. With the help of piezoelectric actuator it is possible in the exemplary stroke transmitter 1 to achieve a quick and precise dosing of large quantities of fluid, in particular of a fuel to a burner 20 of the combustion chamber of a gas turbine.

It may be noted that the valve unit 4 of the stroke transmitter 1 is placed axially along an axis of a fluid feed pipe 11 to the burner 20 and the actuating unit 2 is perpendicular to the axis of the fluid feed pipe 11 to the burner 20.

Figure 2:
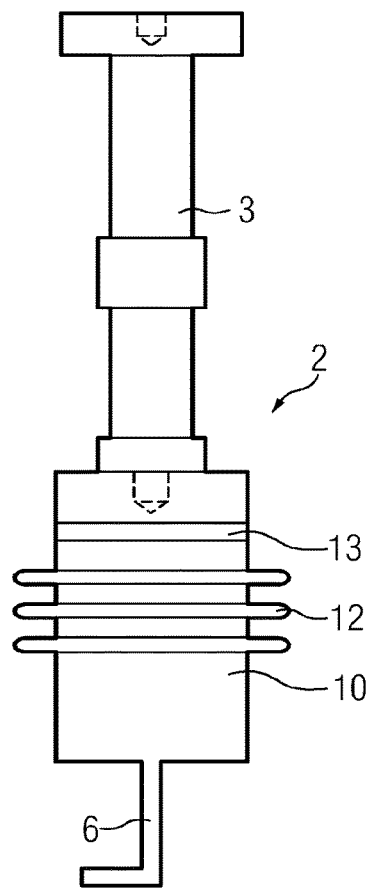
FIG. 2 is a schematic diagram of an actuating unit of the stroke transmitter of FIG. 1.

FIG. 2 is a schematic diagram of the actuating unit 2 of FIG. 1. As illustrated, the actuating unit 2 includes the actuator 3, which, as previously noted is a piezoelectric actuator. The actuator 3 is connected to the first block 10. In one embodiment, a first piston 13 is guided in the first block 10. The actuator 3 causes the first piston 13 to move thereby increasing the pressure in the hydraulic fluid which is filled inside the first block 10.

The pipe 6 connected to the first block 10 of the actuating unit communicates the pressure of the hydraulic fluid to the valve unit 4.

In the presently contemplated configuration, the first block 10 is a metallic bellow 12, which is filled with hydraulic fluid and is connected to the pipe 6. The first block 10 includes hollow space which represents a hydraulic volume. The first block 10 in the form of the metallic bellow 12 reduces friction and drifting which may be caused when the first block 10 is a metallic cylinder. Use of metallic bellow 12 as the first block 10 ensures removal of friction reducing agent, such as grease for example.

Figure 3:
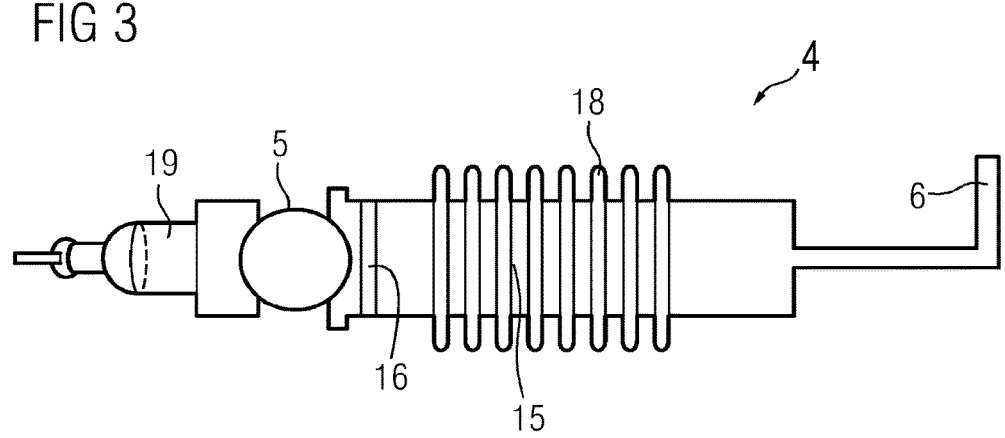
FIG. 3 is a schematic diagram of a valve unit of the stroke transmitter of FIG. 1.

FIG. 3 is a schematic diagram of the valve unit 4 of the stroke transmitter of FIG. 1. As illustrated, the valve unit 4 includes a second block 15. The second block 15 may be in a form of cylinder, for example. The second block 15 is connected to the pipe 6. The pipe 6 communicates pressure from the actuating unit 2 (see FIG. 2) to the second block 15, which causes a second piston 16 to move and thereby open a dosing valve 5 of the valve unit 4 to open for allowing dosed feeding of fluid. The dosing valve 5 includes a sphere or a needle for opening and closing of the dosing valve 5.

In the presently contemplated configuration, the second block 15 is a metallic bellow 18. The second block 15 in the form of a metallic bellow 18 ensures that friction and drifting no longer exist, which is generally caused while using metallic cylinders. The present arrangement ensures a grease free arrangement of the valve unit 4.

The valve unit 4 may also includes a sensor 19 which measures the pressure created inside the valve unit 4 and controls the injection of the fuel into the burner 20.

The invention claimed is:

1. A stroke transmitter, comprising:
   a conduit for providing a passage to a fluid;
   an actuating unit comprising a first block and a first piston, wherein the first piston is guided into the first block thereby increasing a pressure in an hydraulic fluid;
   a valve unit comprising a second block, a dosing valve and a second piston, wherein the second piston is guided into the second block, the valve unit configured to operate depending on the pressure of the hydraulic fluid to regulate a flow of the fluid; and
   a pipe connecting the actuating unit and the valve unit for communicating the pressure of the hydraulic fluid between the actuating unit and the valve unit,
   wherein the actuating unit is arranged outside the conduit, and
   wherein the valve unit is arranged inside the conduit.

2. The stroke transmitter according to claim 1, wherein the actuating unit and the valve unit are arranged at an angle relative to each other.

3. The stroke transmitter according to claim 2, wherein the angle is from 45 degrees to 135 degrees.

4. The stroke transmitter according to claim 1, wherein the actuating unit and the valve unit are arranged perpendicular to each other.

5. The stroke transmitter according to claim 1, wherein the first block of the actuating unit is mechanically coupled to an actuator.

6. The stroke transmitter according to claim 5, wherein the actuator is a piezoelectric actuator.

7. The stroke transmitter according to claim 1, wherein the second block of the valve unit is mechanically coupled to the dosing valve.

8. The stroke transmitter according to claim 1, wherein the dosing valve comprises a needle or a sphere for opening and closing of the dosing valve.

9. The stroke transmitter according to claim 1, wherein the hydraulic fluid comprises oil.

10. The stroke transmitter according to claim 1, wherein the first block and/or the second block is cylindrical in shape.

11. The stroke transmitter according to claim 1, wherein the first block and/or the second block is a metallic bellow.

12. A gas turbine, comprising:
a burner;
a fluid feed pipe; and
a stroke transmitter according to claim 1.

13. The gas turbine according to claim 12, wherein the valve unit of the stroke transmitter is placed axially along an axis of the fluid feed pipe, the fluid feed pipe leading to the burner.

14. The gas turbine according to claim 12, wherein the actuating unit of the stroke transmitter is perpendicular to an axis of the fluid feed pipe, the fluid feed pipe leading to the burner.

* * * * *